United States Patent [19]

Brum

[11] Patent Number: 5,094,405
[45] Date of Patent: Mar. 10, 1992

[54] MECHANICALLY BRAKED TOWED VEHICLE DEPLOYMENT DEVICE

[75] Inventor: Roger D. Brum, Irvine, Calif.

[73] Assignee: Southwest Aerospace Corporation, Tustin, Calif.

[21] Appl. No.: 675,453

[22] Filed: Mar. 26, 1991

[51] Int. Cl.$^5$ ............................................. B64D 3/02
[52] U.S. Cl. ............................ 244/1 TD; 244/138 R; 244/152; 114/247; 114/253; 182/239; 273/360
[58] Field of Search ............ 244/1 TD, 3, 142, 138 R, 244/152, 151 R, 110 A, 110 D; 114/242, 245, 247, 253, 254, 244; 44/24, 25, 26; 182/236, 237, 238, 239, 73; 242/100.1, 99; 188/270, 185; 273/360, 361; 258/1.2, 1.4, 1.6, 1.8

[56] References Cited

U.S. PATENT DOCUMENTS

| | | | |
|---|---|---|---|
| 715,691 | 12/1902 | Porter, Jr. | 182/239 |
| 1,206,676 | 11/1916 | Cote | 182/239 |
| 1,531,926 | 3/1925 | Hallot | 188/185 |
| 2,119,550 | 6/1938 | Loughridge | 188/270 |
| 2,156,294 | 5/1939 | Kessenich | 244/138 R |
| 2,396,071 | 3/1946 | Anderson et al. | 258/1.2 |
| 2,486,999 | 11/1949 | Tapp et al. | 258/1.2 |
| 2,967,683 | 1/1961 | Crater | 244/110 A |
| 4,029,298 | 6/1977 | Lassche | 182/238 |
| 4,416,429 | 11/1983 | Jessamine | 242/100.1 |
| 4,469,196 | 9/1984 | Sadler | 188/270 |

Primary Examiner—Galen Barefoot
Attorney, Agent, or Firm—Stetina and Brunda

[57] ABSTRACT

This invention relates to a mechanically braked vehicle deployment device. The deployment device comprises a spool member having a guide member rigidly connected thereto. A tow line is bifilar wound about the spool member in a manner wherein one end of the tow line extends through the guide member and is attached to an aircraft while the other end extends from the spool member and is attached to a towed vehicle. The towed vehicle and the deployment device are deployed simultaneously, and the spool, by nature of its bifilar winding, assumes a position between the aircraft and the towed vehicle. A braking assembly is interfaced to the spool member in a manner operable to provide a braking force during payout of the towed vehicle to control the rotational speed of the spool during tow line payout. At the end of the towed vehicle payout, the deployment device is adapted to disengage itself from the tow line and propel itself away from the tow line and clear of the towed vehicle.

16 Claims, 2 Drawing Sheets

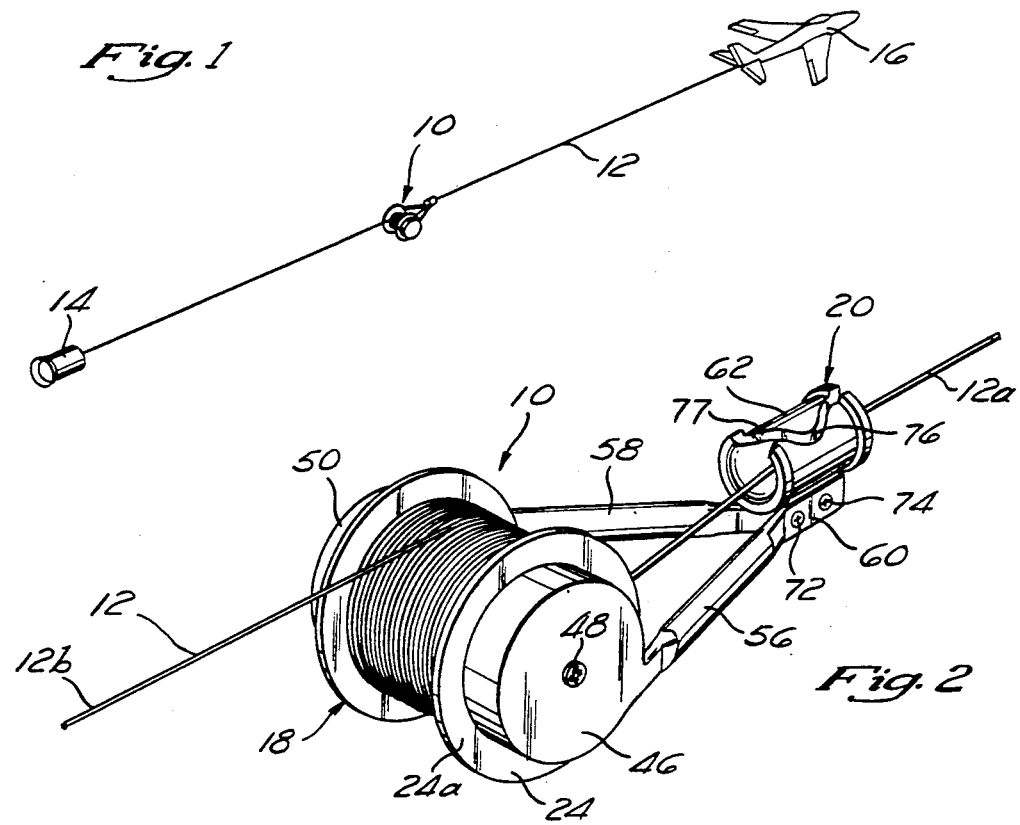
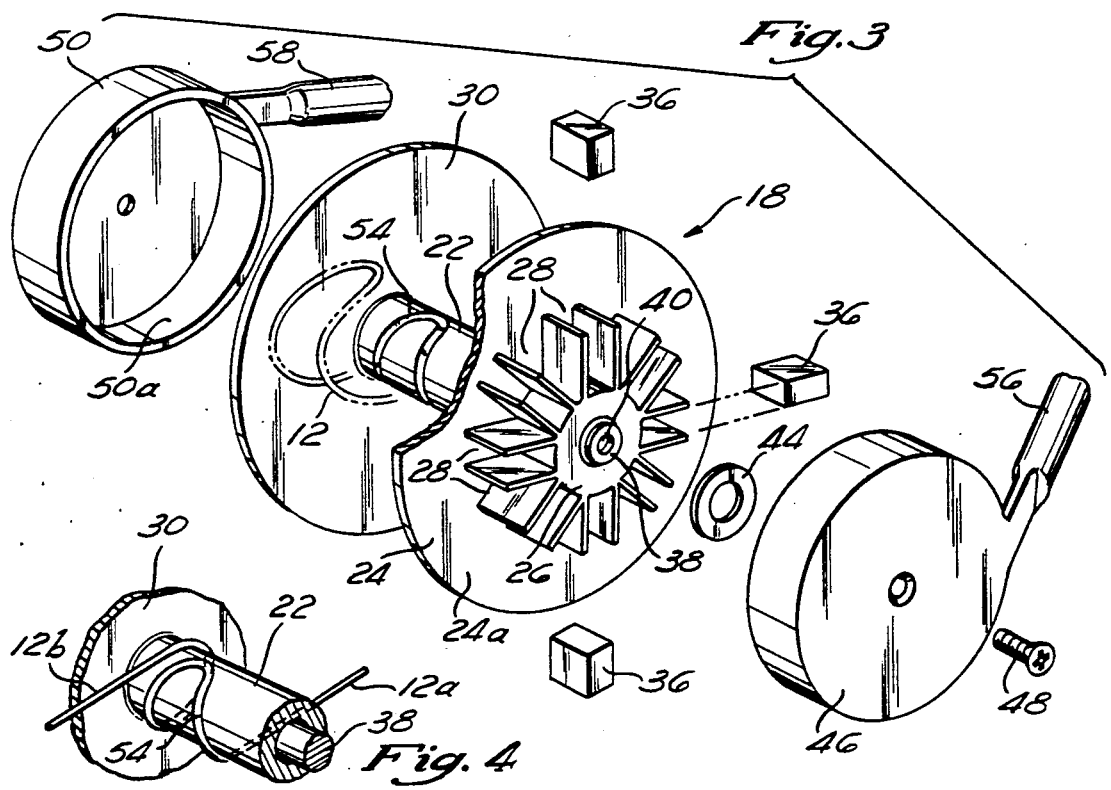

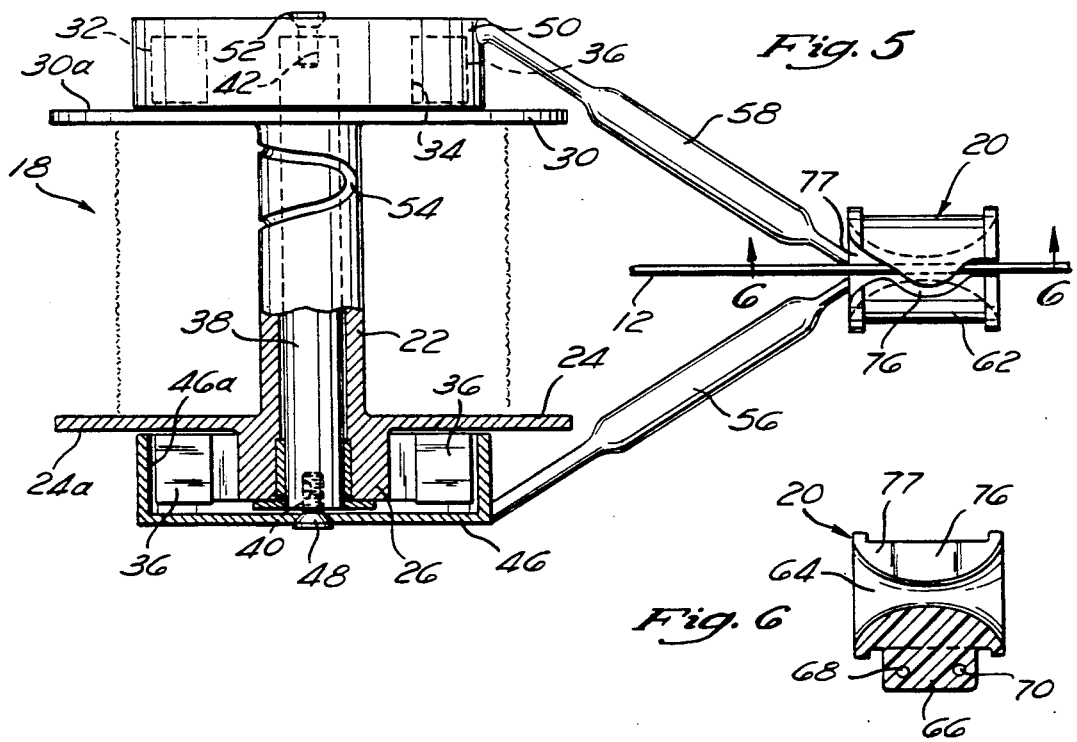
Fig. 5
Fig. 6
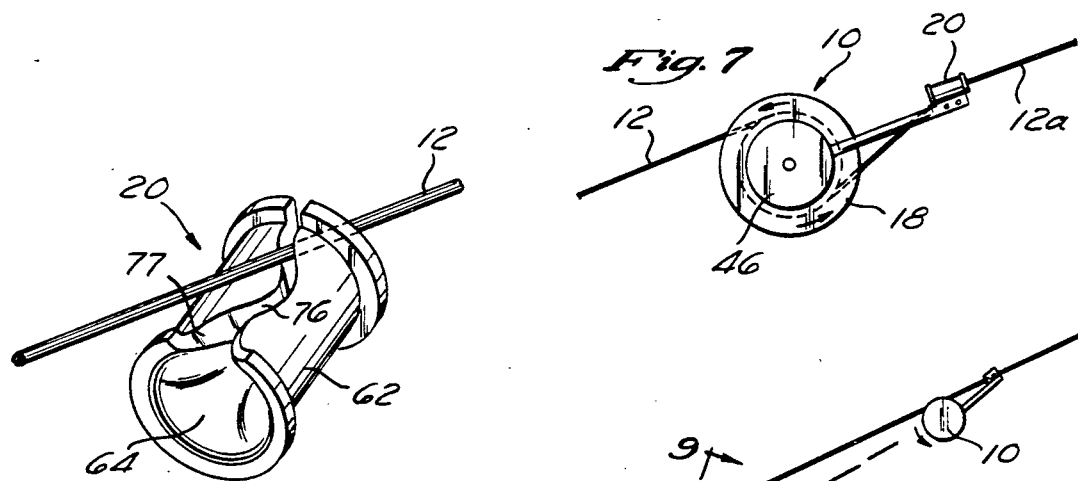
Fig. 7
Fig. 9
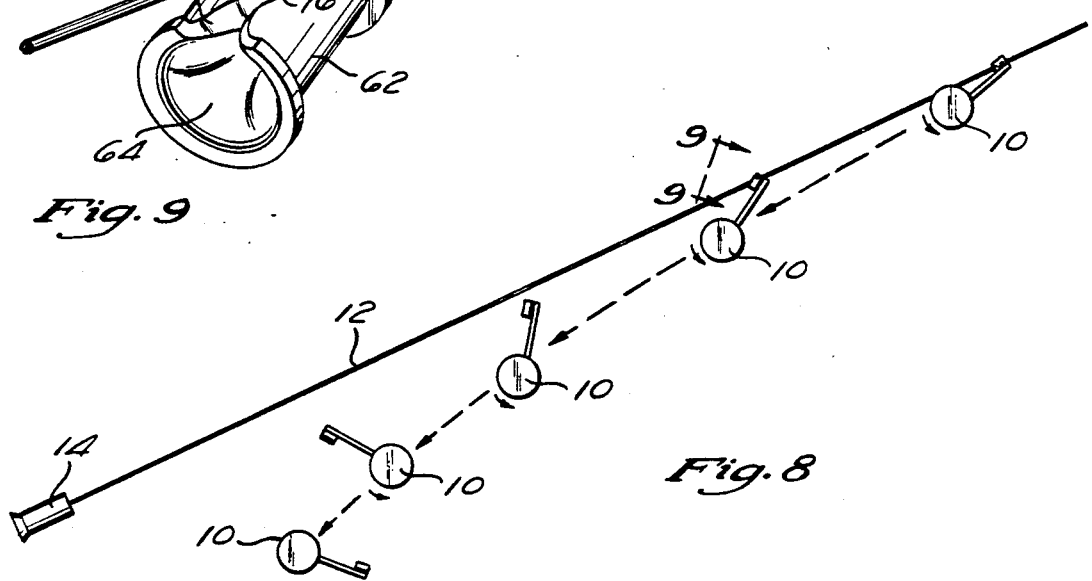
Fig. 8

MECHANICALLY BRAKED TOWED VEHICLE DEPLOYMENT DEVICE

FIELD OF THE INVENTION

The present invention relates generally to towed vehicles such as aerial targets and decoys and more particularly to a mechanically braked towed vehicle deployment device used to deploy such towed vehicles behind military aircraft.

BACKGROUND OF THE INVENTION

In military applications, two types of towed vehicles are well-known and often used for weapon/gunnery practice and aircraft protection. These are aerial towed targets and aerial towed decoys, respectively. Aerial towed targets are typically towed behind an aircraft and used in conjunction with pilot weapon training exercises. Aerial towed decoys are used to draw various types of guided weapons away from an aircraft that the weapons are intended to destroy and/or used to evaluate effectiveness of guided weapon systems. Examples of an aerial target and aerial decoy are shown in U.S. Pat. No. 4,205,848 to Smith et al. and U.S. Pat. No. 4,852,455 to Brum, respectively.

Both aerial towed targets and decoys typically include electronic devices and circuitry incorporated therein. In this respect, aerial towed targets include various electronic devices which are used for purposes of scoring the pilot's performance during a training exercise. The decoys contain various types of electronic circuits which are operable to create an apparent target to a weapon to attract the weapon to the decoy, rather than the aircraft. One such electronic device is a transponder which is adapted to receive radar signals and re-broadcast an amplified return signal. The transponder is designed to present a larger electronic target than the aircraft from which it is deployed and thereby attract the weapon away from the aircraft.

In those deployment systems in which the towed vehicle is electrically interfaced to the aircraft, the electronic data transmission between the towed vehicle and aircraft is typically facilitated via the tow line used to interconnect the towed vehicle to the aircraft. Data transmitting tow lines as currently utilized generally comprise a core of standard conducting material extending throughout the tow line forming an electrical communication line between the towed vehicle and the aircraft. As the programming of anti-aircraft weaponry becomes more sophisticated to better discriminate between decoys and aircraft, the need to provide decoys within enhanced electrical capabilities similarly evolves. Additionally, as fighter weaponry becomes more advanced, it is likewise necessary to supply targets with enhanced data transmission and receiving capabilities. Thus, it is increasingly necessary for the tow line to transmit greater amounts of data and to conduct such transmission at a faster rate.

Further electrical conducting materials as currently utilized in data transmitting tow lines are highly susceptible to RF (radio frequency) interference which diminishes the data transfer capability of the tow line. It has been found that the shortcomings of conventionally known data transmitting tow lines can be overcome through the use of a tow line having a fiber optic core to establish the communications link between the aircraft and the towed vehicle. Such a fiber optic link has the advantage of providing enhanced data transmission rates as well as eliminating susceptibility to RF interference.

Though some aerial towed targets as currently manufactured are intended to be sacrificial, i.e. non-recoverable, others are intended to be recoverable. As can be appreciated, decoys by their very nature are intended to be sacrificial only, i.e. the tow line is cut at the aircraft at the end of a flight or mission. Though decoys and certain varieties of aerial towed targets are sacrificial, the need for rapid and reliable data exchange between these towed vehicles and the aircraft is of utmost importance for the reasons as previously discussed.

With regard to both recoverable and sacrificial towed vehicles, perhaps the most critical stage in the utilization of such towed vehicles lies in their initial deployment. The difficulty regarding deployment lies in the fact that the tow line must be able to withstand the extreme amount of tensile force exerted thereon by the drag of the vehicle during the deployment operation, particularly at the end of the payout of the vehicle. In one currently known deployment technique, the tow line is wrapped or folded at either the aircraft end or the towed vehicle end and allowed to pay out freely without braking. This particular deployment technique is primarily used in conjunction with sacrificial towed vehicles. In using this particular technique, the elasticity of the tow line must absorb the kinetic energy arising from the relative velocity of the towed vehicle to the aircraft at the end of the towed vehicle payout. As can be appreciated, oftentimes the tow line will snap during deployment, rendering the towed target or decoy irretrievably lost. Additionally, this particular deployment technique is only effective at relatively low aircraft speeds since at higher aircraft speeds, the mass of the tow line itself prevents full use of its elasticity which typically results in line failure at the end of the payout. Additionally, this particular technique does not lend itself to the transmission of power and electronic information through the tow line, the importance of which has been previously discussed. Since the tow line must possess such a high degree of elasticity so as not to snap, the line itself will typically cause the conductors within it to fail when it stretches. Thus, a tow line having a fiber optic core could not be used since the tow line elasticity would cause a failure of the fiber optics when the vehicle is deployed.

A second technique of deploying both sacrificial and recoverable towed vehicles involves the fixing of spools at either the aircraft or the towed vehicle to control the payout and braking of the tow line. In this respect, the tow line is wrapped about the spool and allowed to be payed out in a controlled manner. An example of a first deployment system which is operated in this manner and intended to be used in conjunction with sacrificial towed vehicles (i.e. decoys) is shown in U.S. Pat. No. 4,852,455 to Brum. In this particular system, the decoy is initially stored within a canister which is permanently attached to the aircraft. The canister includes a spool rotatably connected thereto about which the tow line is wound. The decoy is released from the canister via an explosive charge, and payed out behind the aircraft through the rotation of the spool. Centrifugal brakes are provided within the canister to oppose the rotation of the spool and thereby regulate the reeling payout speed of the deployed tow line. The tow line is adapted to communicate electrical signals to the decoy to regulate the operation of the electrical circuitry disposed therein. Electrical signals which are intended to be passed to the decoy through the tow line are communicated to the canister via one or more pin connectors. The pin connectors are interfaced to complimentary dynamic slip rings which are interfaced to the spool and tow line in a manner operable to transfer the electrical signals from the aircraft to the tow line and hence the decoy.

A second type of deployment system which utilizes the second technique and is used primarily With recoverable aerial targets comprises a bi-directional reeling machine. Examples of such reeling machines are shown in U.S. Pat. No. 4,770,368 to Yates et al.; U.S. Pat. No. 2,760,777 to Cotton; U.S. Pat. No. 2,778,584 to Wilson; U.S. Pat. No. 2,892,599 to Baldwin et al.; and U.S. Pat. No. 2,751,167 to Hopper. Such reeling machines typically utilize electric motors, as well as other types of supplementary power devices and brakes which are interfaced to a spool in a manner operable to reel equipment in and out from an aircraft. Additionally, some of these reeling machines are powered by means of an air driven turbine interfaced to a spool which can take advantage of the available power produced by the ram air energy impinging upon the device during aircraft flights. The aforementioned references all comprises reeling systems which are adapted to be permanently affixed to the aircraft. With regard to the paying out of the towed vehicle, the Cotton, Wilson and Baldwin references all disclose fixed pitch turbine blade design concepts with various means of throttling the air mass flow through the turbine in order to solely control the reel in rate and not the reel out rate of the towed vehicle. In this respect, Cotton controls reeler payout by means of a motor applied friction brake while Wilson and Baldwin rely upon centrifugally applied friction brakes to control reel out rate or speed which function in a manner substantially identical to that as previously discussed with respect to the Brum reference. The Hopper reference discloses a variable pitch turbine in which the blades of the turbine may be rotated to various attack angles to provide torque for reel in or provide opposing torque for reel out applications. However, this variable pitch turbine blade design is extremely expensive and requires constant operator monitoring of turbine speed and hence, has not been widely utilized in the prior art. The alternative disclosed in Hopper, i.e. having a fixed pitch turbine coupled to a reversing gear train to achieve reel in, reel out bi-directional operation give rise to the complexity of a reversing gear train which has likewise prevented the design's widespread use.

It will be appreciated that the aforementioned bi-directional reeling devices adapted to reel in and reel out towed vehicles are generally not used in conjunction with sacrificial vehicles in that there is typically no need to reel in a sacrificial vehicle. To the extent that these devices are used with towed vehicles requiring an electrical interface to the aircraft, electrical transfer mechanisms similar to that previously discussed with regard to the Brum reference, i.e. slip rings, are typically incorporated into these devices for purposes of conducting electrical data transfer.

Though the unidirectional and bi-directional reeling devices are operable to pay out the towed vehicle at a controlled rate, the use of slip rings for data transmission purposes does not lend itself to the use of tow lines incorporating fiber optics. Thus, the aforementioned reeling devices are not typically able to provide the enhanced data transmission capabilities facilitated by a fiber optic link. Such reeling devices also require high amounts of maintenance to insure the proper functioning of the braking mechanisms. Additionally, the use of such reeling devices necessitates the permanent affixation of a spool and brake assembly to the aircraft.

SUMMARY OF THE INVENTION

The present invention is specifically directed toward meeting the aforementioned shortcomings in towed vehicle deployment systems. In the present invention, the tow line is fixed at both the aircraft and towed vehicle ends of the tow line thereby eliminating the need for slip rings. The tow line is stowed on a bifilar wound spool disposed along the length of the tow line such that the aircraft and towed vehicle ends of the tow line are simultaneously unwound during payout. The towed vehicle and the spool are deployed simultaneously and the spool, by nature of its wrapping, assumes a position between the aircraft and the towed vehicle. The spool provides braking force during payout to deploy the towed vehicle at a controlled rate within system parameters to insure that throughout payout and particularly at full payout, the tensile load applied to the tow line is sufficiently small so as to prevent tow line failure. At the end of the payout, the spool disengages itself from the tow line and propels itself away from the tow line and clear of the towed vehicle.

More particularly, in accordance with a preferred embodiment of the present invention, there is provided a mechanically braked towed vehicle deployment device which generally comprises a spool member and a guide member rigidly connected to the spool member. The spool member itself comprises a sleeve portion which includes an aperture extending axially therethrough. A first laterally extending flange portion is formed adjacent the first end of the sleeve which defines an outer surface having a first spider portion formed thereon. The first spider portion itself defines a first set of cavities disposed about the periphery thereof. Formed adjacent the second end of the sleeve portion is a second laterally extending flange portion which, like the first flange portion, also defines an outer surface having a second spider formed thereon. The second spider portion has a configuration identical to the first spider portion and defines a second set of cavities disposed about the periphery thereof. A length of cable (i.e. the tow line) is bifilar wound about the spool member in a manner wherein the first end extends through the guide member and is attached to an aircraft and the second end is attached to the towed vehicle.

The spool member includes brake means associated therewith which are operable to control i.e. slow the deployment of the towed vehicle behind the aircraft. The brake means comprise an elongate shaft which is sized and configured to be slidably receivable into the aperture defined within the sleeve portion. A first drum member defining a first arcuate interior surface is positioned over the first spider portion and rigidly connected to the first end of the shaft. Similarly, a second drum member defining a second arcuate interior surface is positioned over the second spider portion and rigidly connected to the second end of the shaft. Inserted into the first set of cavities defined within the first spider portion are a plurality of brake pads. A plurality of brake pads are likewise inserted into the second set of cavities defined within the second spider portion. In operation, the rotation of the sleeve portion about the shaft is operable to cause each of the brake pads to move radially outwardly via centrifugal force so as to come in abutting contact with the interior surface of a respective drum member thereby slowing the rotation of the spool member relative the drum members and shaft.

The guide member is rigidly connected to the first drum member by a first connecting member and to the second drum member by a second connecting member. The guide member further includes a disengagement or ejection means which is operable to release the guide member and hence the spool member from the tow line when the towed vehicle is fully deployed. The disengagement means preferably comprises a serpentine slot disposed within the guide member which is sized and configured to allow the tow line to pass therethrough when the guide member is pulled downwardly against the tow line.

Importantly, the first connecting member and the second connecting member are sized and configured so as to act as lever arms such that the torque created by the rotation of the spool member after the towed vehicle has been fully deployed will pull the guide member toward the tow line in a manner operable to facilitate the ejection of the guide member from the tow line. The tow line itself preferably includes a fiber optic core which is adapted to transmit signals between the towed vehicle and the aircraft. Advantageously, the bifilar winding of the tow line about the spool member is adapted to simultaneously deploy the towed vehicle and the deployment device and to maintain the deployment device in a position typically equidistantly spaced between the towed vehicle and the aircraft while the towed vehicle is being deployed. The sleeve portion includes a groove formed therein which is adapted to receive a portion of the tow line in a manner operable to initiate the bifilar winding of the tow line about the spool member and to cause the spool member to rotate about the shaft while the towed vehicle is being deployed. In the preferred embodiment, the spool member is constructed from aluminum, the drum members are constructed from stainless steel, and the guide member is constructed from Teflon.

It is an object of the present invention to provide a vehicle deployment device adapted to deploy a towed vehicle at a controlled rate of speed.

Another object of the present invention is to provide a towed vehicle deployment device having enhanced electronic data transmission capabilities.

Another object of the present invention is to provide a towed vehicle deployment device which is disposable and eliminates the need for the permanent attachment of a deployment mechanism to the aircraft or to the towed vehicle.

BRIEF DESCRIPTION OF THE DRAWINGS

These as well as other features of the present invention will become apparent upon reference to the drawings wherein:

FIG. 1 is a perspective view of the vehicle deployment device of the present invention as positioned during the payout of a towed vehicle behind an aircraft;

FIG. 2 is a perspective view of the present invention as interfaced to the tow line;

FIG. 3 is an exploded view illustrating the components comprising the present invention;

FIG. 4 is a partial perspective view illustrating the manner in which the tow line is bifilar wound about the spool of the present invention;

FIG. 5 is a top view of the present invention, further including a partial cutaway view of the spool and braking mechanism;

FIG. 6 is a cross sectional view taken along line 6—6 of FIG. 5;

FIG. 7 is a side view illustrating the rotational direction of the spool member of the present invention when interfaced to the tow line during the payout of the towed vehicle;

FIG. 8 is a side view illustrating the manner in which the vehicle deployment device of the present invention is disengaged and thus ejected from a tow line after the towed vehicle has been fully deployed; and FIG. 9 is a perspective view taken along line 9—9 of FIG. 8, illustrating the manner in which the guide member of the present invention is released from the tow line.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 perspectively illustrates the mechanically braked vehicle deployment device 10 of the present invention positioned on a tow line 12 as a towed vehicle 14 is being payed out behind an aircraft 16. Towed vehicle 14 as used with deployment device 10 is typically a sacrificial towed vehicle such as an aerial target or a decoy. Thus, towed vehicle 14 is intended to be released from aircraft 16 as opposed to being reeled back toward aircraft 16. Additionally, towed vehicle 14 will typically be of a variety incorporating electronic devices and circuitry therein. As such, tow line 12 is adapted to transmit electrical data from aircraft 16 to towed vehicle 14. In the preferred embodiment, tow line 12 has a fiber optic core to facilitate such data transmission, however more conventional electrical data transmission systems such as metal conductors are also contemplated. The inclusion of a fiber optic core within tow line 12 enhances the electrical data transmission capabilities between the aircraft 16 and the towed vehicle 14 by increasing the amount of data that may be transmitted through tow line 12 as well as increasing the speed at which such data is transmitted. Additionally, the fiber optic communications link is not susceptible to RF (radio frequency) interference as are other more conventional types of conducting/transmission materials. It will be appreciated, however, that towed vehicle 14 need not necessarily incorporate electrical devices therein, and that tow line 12 may be constructed in a manner so as not to include any electrical conducting capabilities.

Referring now to FIG. 2, deployment device 10 generally comprises a rotatable spool member 18 having a guide member 20 interfaced thereto. As will be discussed in greater detail below, the tow line 12 is bifilar wound about the spool member 18 in a manner wherein a first end 12a of tow line 12 extends through guide member 20 and is attached to aircraft 16 while the second or opposite end 12b is attached to towed vehicle 14. Since the tow line 12 is fixed at both the aircraft and towed vehicle ends of the tow line 12, the need for slip rings or other similar rotary interface devices to facilitate any desired electrical data transmission between the aircraft 16 and the towed vehicle 14 is eliminated. Additionally, on the basis of the tow line 12 being bifilar wound about the spool member 18, the ends of the tow line 12 attached to the towed vehicle 14 and aircraft 16 are simultaneously unwound during payout. Since the towed vehicle 14 and deployment device 10 are deployed simultaneously, by nature of the bifilar winding of the tow line 12 about the spool member 18, the deployment device 10 assumes a position between the aircraft 16 and towed vehicle 14 during payout of the towed vehicle 14.

Referring now to FIGS. 3-5, spool member 18 generally comprises a sleeve portion 22 which includes an aperture extending axially therethrough. Formed adjacent a first end of sleeve portion 22 is a first laterally extending flange portion 24 which defines a generally planar outer surface 24a. Formed on outer surface 24a is a first spider portion 26 which defines a plurality of rectangularly configured cavities 28 extending about the periphery thereof. Formed adjacent the second end of sleeve portion 22 is a second laterally extending flange portion 30 which, like first flange portion 24, also defines a generally planar outer surface 30a. Formed on outer surface 30a of flange portion 30 is a second spider portion 32 which has a configuration identical to first spider portion 28. In this respect, second spider portion 32 defines a plurality of generally rectangular cavities 34 about the periphery thereof. Inserted into one or more of the cavities 28 defined within first spider portion 26 are brake pads 36. Though not shown, brake pads 36 are also disposed within one or more of the cavities 34 defined within second spider portion 32. Brake pads 36, which are preferably constructed from conventional brake lining material, are used in conjunction with the braking mechanism in a manner which will be described in greater detail below.

Disposed within the aperture extending axially through sleeve portion 22 is an elongate shaft member 38 which includes a first axially extending aperture 40 in one end thereof and a second axially extending aperture 42 in the opposite end thereof, each of which are internally threaded. Shaft member 38 is slidably received and adapted to rotate relative sleeve portion 22 and has a length such that each end protrudes slightly outwardly beyond the spider portion through which it extends. Positioned about each exposed portion of the shaft member 38 are thrust washers 44. One such thrust washer 44 is illustrated in FIG. 3. A first drum member 46 defining a first arcuate interior surface 46a is positioned over the first spider portion 26 and rigidly connected to the first end of shaft member 38 by a first screw fastener 48 which is threadably received into first aperture 40. Importantly, first drum member 46 is sized and configured such that there is only a slight radial distance separating first arcuate interior surface 46a from the periphery of first spider portion 26. A second drum member 50 defining a second arcuate interior surface 50a is positioned over second spider portion 32 and rigidly connected to the second end of shaft member 38 by a second screw 52 which is threadably received into second aperture 42. Like first drum member 46, second drum member 50 is also sized and configured such that there is only a slight radial distance separating second arcuate interior surface 50a from the periphery of second spider portion 32.

As previously specified, tow line 12 is bifilar wound about the spool member 18. In this respect, formed within the outer surface of sleeve portion 22 is a groove 54 which is adapted to receive a central portion of tow line 12 in a manner operable to initiate the bifilar winding of tow line 12 about sleeve portion 22 in the manner shown in FIG. 4.

Guide member 20 is connected to first drum member 46 by a first connecting member 56 and to second drum member 50 by a second connecting member 58. In the preferred embodiment, first connecting member 56 and second connecting member 58 are formed as integral portions of first drum member 46 and second drum member 50, respectively, though it will be appreciated that connecting members 56, 58 may be independent components attached to a respective drum member by a welding operation or other fastening procedure. First connecting member 56 and second connecting member 58 are interfaced to first drum member 46 and second drum member 50, respectively, in a manner such that their distal ends terminate in approximately the same location. Formed on the distal end of first connecting member 56 is a first elongate coupling portion 60 having a generally rectangular configuration. Similarly, disposed on the distal end of second connecting member 58 is a second coupling portion (not shown) which has a configuration identical to first coupling portion 60. First coupling portion 60 and the second coupling portion are configured in a manner so as to extend generally parallel to one another while being separated by a relatively narrow gap.

Guide member 20 generally comprises a tubular portion 62 having a bore 64 through which one end of tow line 12 is adapted to extend. As best seen in FIG. 6, the diameters of the opposed ends of bore 64 are preferably formed significantly greater than the diameter of the center portion defining a bell shaped annular transition to aid in allowing tow line 12 to be easily pulled axially therethrough during deployment of the towed vehicle 14. Extending outwardly from the outer surface of tubular portion 62 is a flange 66 having apertures 68, 70 disposed therein. Flange 66 is sized to have a thickness such that it may be inserted into the gap defined between first coupling portion 60 of first connecting member 56 and the second coupling portion of second connecting member 58. Apertures 68, 70 are disposed within flange 66 in an orientation such that they will be in coaxial alignment with pairs of apertures disposed within first coupling Portion 60 and the second coupling portion. Screw fasteners 72, 74 are then placed within the coaxially aligned holes and apertures to facilitate the attachment of guide member 20 to first connecting member 56 and second connecting member 58. Additionally, disposed within the tubular portion 62 of guide member 20 is a serpentine shaped slot 76, the use of which will be discussed in greater detail below.

Having thus described the components of deployment device 10, the operation thereof will now be discussed. Initially, the tow line 12 is preferably folded in half and the loop portion formed by the fold is inserted into groove 54 as seen in FIG. 3. As tow line 12 is being wound about sleeve portion 22, it is constantly moved from side to side between first flange portion 24 and second flange portion 30 so as to maintain an even distribution of the tow line 12 windings about sleeve portion 22. After the winding operation has been completed, one end of tow line 12 is extended over the winds on the spool and is attached to the towed vehicle 14 while the other end of the tow line is extended under the winds on the spool at a 180 degree orientation to the first end, inserted through guide member 20 and attached to aircraft 16. After the aircraft 16 is in flight, the deployment device 10 and towed vehicle 14 are simultaneously ejected from the aircraft 16. The velocity of aircraft 16 in conjunction with the drag exerted on towed vehicle 14 causes towed vehicle 14 to be payed out behind the aircraft 16.

Referring now to FIG. 7, as previously specified, the bifilar winding of tow line 12 about sleeve portion 22 of spool member 18 causes the opposed ends of the tow line 12 to be simultaneously unwound during payout of the towed vehicle 14 behind the aircraft 16. Thus, since deployment device 10 is only attached to tow line 12, the payout of the towed vehicle 14 will cause the spool member 18 to begin rotating in the direction shown in FIG. 7 during the payout process. Since shaft member 38 is rigidly connected to drum members 46, 50 which are in turn rigidly connected to guide member 20, the positioning of guide member 20 about the tow line prevents any component of deployment device 10 other than spool member 18 from rotating. In this regard the guide member positively captures the tow line therein while allowing axial movement of the tow line therethrough. During the payout process, and dependent upon aircraft flight speed and system parameters the spool member rotates at a controlled speed preferably approximately 5,000-20,000 RPM about shaft member 38. This high speed of rotation causes each of the brake pads 36 inserted into the cavities 28 of first spider portion 26 and the cavities 34 of second spider portion 32 to move radially outwardly via centrifugal force within a respective cavity. Such outward radial movement during the rotation of the spool member 18 causes the brake pads 36 disposed within cavities 28 to come in abutting contact with the interior arcuate surface 46a of first drum member 46. Similarly, the brake pads 36 disposed within cavities 34 are caused to come in abutting contact with the second arcuate interior surface 50a of second drum member 50. As can be appreciated, this contact provides a frictional braking force during the payout of towed vehicle 14 so as to allow deployment of towed vehicle 14 at a rate within system parameters. This in turn prevents the failure i.e. breakage of the tow line 12 during the deployment of the towed vehicle 14 particularly when it comes to the end of payout. Additionally it will be recognized that due to the lateral spacing of the guide member from the spool, the braking forces applied to the spool are reacted by guide member upon the tow line with the members 56 and 58 forming a lever arm between the brake drums 46 and 50 and the guide member 20. The guide member 20 is positioned over the first end 12a of tow line 12 which is attached to the aircraft 16 since first end 12a is better capable of reacting to the brake torque. In this respect, the tension is higher at the aircraft end 12a than at the towed vehicle end 12b since the drag of the deployment device 10 itself is superimposed on the towed vehicle drag. Guide member 20 also serves to maintain the spool axis perpendicular to the airstream thereby promoting an orderly payout of the tow line 12. The number of braking pads 36 disposed within cavities 28 or cavities 34 is determined by the desired amount of braking force that is to be applied to spool member 18 during the deployment of towed vehicle 14. As can be appreciated, as the number of braking pads 36 inserted into cavities 28, 34 is increased, the amount of braking force that will be applied to spool member 18 will likewise be increased.

As towed vehicle 14 is being deployed, the velocity at which the tow line 12 is unwound from spool member 18 and the drag force exerted by towed vehicle 14 causes each end of tow line 12 to remain taught during the payout of towed vehicle 14. As such, though the end of tow line 12 extending through guide member 20 is free to axially move within bore 64, the tow line 12, due to its taught configuration, is positively capture within the guide member 20 and is prevented from traveling through serpentine slot 76.

Referring now to FIGS. 7-9, due to the bifilar winding of tow line 12 about spool member 18, when the towed vehicle 14 is fully deployed, the tow line 12 will be removed from within groove 54 and hence be disconnected from spool member 18. When this disconnection occurs, the spool member 18 will still be rotating about shaft member 38 at a high rate of speed so its centrifugal brakes will still be engaged. In the preferred embodiment, the first connecting member 56 and the second connecting member 58 are sized and configured to act as lever arms such that the torque created by the high rotation of the spool member 18 about shaft member 38 after the towed vehicle 14 has been fully deployed will pull guide member 20 against tow line 12. This pulling of guide member 20 against tow line 12 is operable to alter the angle between the guide member 20 and tow line 12 causing the tow line 12 to rapidly move through the serpentine slot 76 in the manner shown in FIG. 9. The receipt of tow line 12 into slot 76 is further aided by the lead in portion 77 of the serpentine slot 76 and open diameter ends of the tubular portion 62 of guide member 20 as previously described. After tow line 12 moves completely through serpentine slot 76, the deployment device 10 is thereby released from the tow line and is ejected i.e. falls away from the tow line 12 in the manner illustrated in FIG. 8. As can be appreciated, if the deployment device 10 was not ejected from the tow line 12 in this manner, the force of air exerted against the deployment device 10 could cause it to accelerate down the tow line 12 to impact the towed vehicle 14, thereby damaging or destroying the towed vehicle 14. In the preferred embodiment, spool member 18 is constructed from aluminum, brake drums 46 and 50 are constructed from stainless steel as are connecting members 56 and 58, and guide member 20 is constructed from Teflon or nylon. Additionally, deployment device 10 may be oriented in a manner wherein the end of tow line 14 extending through guide member 20 is attached to the towed vehicle 14 as opposed to the aircraft 16, although it is not preferable.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A towed vehicle deployment device for use between a towed vehicle and an aircraft comprising:
  a length of tow line attachable at one end to the towed vehicle and at the opposite end to the aircraft;
  a spool disposed upon the length of said tow line and formed to store said length of tow line in bifilar windings thereupon and payout said tow line during rotational movement; and
  brake means cooperating with said spool to control the speed of rotational movement of said spool during payout of said tow line.

2. The towed vehicle deployment device of claim 1 wherein said brake means comprises:
   a mechanical brake mounted to said spool; and
   a guide member laterally spaced from said spool adapted to engage said length of tow line and react to braking force applied to said spool during payout of said length of tow line.

3. The towed vehicle deployment device of claim 2 wherein said guide member includes means to disengage said length of tow line upon completion of payout of the length of tow line.

4. The towed vehicle deployment device of claim 3 wherein said disengagement means comprises a serpentine slot formed in said guide member.

5. The towed vehicle deployment device of claim 4 wherein said mechanical brake comprises a centrifugal brake mounted upon said spool.

6. A mechanically braked towed vehicle deployment device comprising:
   a spool member;
   a guide member rigidly connected to said spool member;
   braking means associated with said spool member, said braking means being operable to slow the deployment of said towed vehicle behind said aircraft;
   a disengagement means associated with said guide member, said disengagement means being operable to release said deployment device from a tow line when said towed vehicle is fully deployed; and
   said tow line having a first end and a second end and being bifilar wound about said spool in a manner wherein said first end extends through said guide member and is attached to an aircraft and said second end is attached to a towed vehicle.

7. The device of claim 6 wherein said spool member comprises:
   a sleeve portion having a first end and a second end, said sleeve portion defining an aperture extending axially therethrough;
   a first laterally extending flange portion adjacent said first end of said sleeve portion, said first flange portion having an outer surface including a first spider portion formed thereon, said first spider portion defining a first set of cavities disposed about the periphery thereof; and
   a second laterally extending flange portion adjacent said second end of said sleeve portion, said second flange portion having a second outer surface including a second spider portion formed thereon, said second spider portion defining a second set of cavities disposed about the periphery thereof.

8. The device of claim 7 wherein said braking means comprises:
   an elongate shaft having a first end and a second end, said shaft being sized and configured to be slidably receivable into said aperture;
   a first drum member defining a first arcuate interior surface, said first drum member being sized and configured to be positionable over said first spider portion and rigidly connected to said first end of said shaft;
   a first set of brake pads, each of said brake pads comprising said first set being sized and configured to be slidably insertable into any one of said first set of cavities;
   a second drum member defining a second arcuate interior surface, said second drum member being sized and configured to be positionable over said second spider portion and rigidly connected to said second end of said shaft; and
   a second set of brake pads, each of said brake pads comprising said second set being sized and configured to be slidably insertable into any one of said second set of cavities;
   wherein rotation of said sleeve portion about said shaft is operable to cause each of said brake pads comprising said first set to move radially outwardly within a respective cavity so as to come in abutting contact with said first arcuate interior surface and each of said brake pads comprising said second set to move radially outwardly within a respective cavity so as to come in abutting contact with said second arcuate interior surface.

9. The device of claim 8 wherein said first set of brake pads and said second set of brake pads each comprise at least one brake pad.

10. The device of claim 7 wherein the bifilar winding of said tow line about said spool member is adapted to simultaneously deploy said towed vehicle and said deployment device behind said aircraft in a manner operable to maintain said deployment device in a position equidistantly spaced between said towed vehicle and said aircraft and to cause said spool member to rotate about said shaft while said towed vehicle is being deployed.

11. The device of claim 10 wherein said guide member is rigidly connected to said first drum member by a first connecting member and to said second drum member by a second connecting member.

12. The device of claim 11 wherein said first connecting member and said second connecting member are sized and configured so as to act as lever arms such that the torque created by the rotation of said spool member about said shaft after said towed vehicle has been fully deployed will pull said guide member downwardly toward said tow line in a manner operable to trigger said disengagement means.

13. The device of claim 12 wherein said disengagement means comprises a serpentine slot disposed within said guide member, said slot being sized and configured to allow said tow line to pass therethrough when said guide member is pulled downwardly against said tow line.

14. The device of claim 10 wherein said sleeve portion includes a groove formed therein, said groove being adapted to receive a portion of said tow line in a manner operable to initiate the bifilar winding of said tow line about said spool member.

15. The device of claim 6 wherein said tow line includes a fiber optic core adapted to transmit signals between said towed vehicle and said aircraft.

16. A mechanically braked vehicle deployment device comprising:
   a spool member;
   a guide member rigidly connected to said spool member;
   braking means associated with said spool member, said braking means being operable to slow the deployment of said towed vehicle behind said aircraft;
   a disengagement means associated with said guide member, said disengagement means being operable to release said deployment device from a tow line when said towed vehicle is fully deployed; and
   said tow line having a first end and a second end and being bifilar wound about said spool member in a manner wherein said first end is attached to an aircraft and said second end extends through said guide member and is attached to a towed vehicle.

* * * * *